US012231580B1

(12) United States Patent
McMahon et al.

(10) Patent No.: US 12,231,580 B1
(45) Date of Patent: Feb. 18, 2025

(54) SYSTEMS AND METHODS FOR ESTABLISHING DATA PROVENANCE BY GENERATING ONE-TIME SIGNATURES

(71) Applicant: Citigroup Technology, Inc., New York, NY (US)

(72) Inventors: Alex McMahon, North Dock (IE); Paul Carey, North Dock (IE); Sudha Iyer, North Dock (IE)

(73) Assignee: Citigroup Technology, Inc., New York, NY (US)

( * ) Notice: Subject to any disclaimer, the term of this patent is extended or adjusted under 35 U.S.C. 154(b) by 0 days.

(21) Appl. No.: 18/602,523

(22) Filed: Mar. 12, 2024

(51) Int. Cl.
*H04L 9/32* (2006.01)
*H04L 9/08* (2006.01)

(52) U.S. Cl.
CPC .......... *H04L 9/3247* (2013.01); *H04L 9/0869* (2013.01); *H04L 9/0825* (2013.01); *H04L 9/0866* (2013.01); *H04L 9/3249* (2013.01); *H04L 9/3252* (2013.01); *H04L 9/3255* (2013.01); *H04L 9/3257* (2013.01)

(58) Field of Classification Search
None
See application file for complete search history.

(56) References Cited

U.S. PATENT DOCUMENTS 11,184,157 B1 * 11/2021 Gueron ...................... H04L 9/14
11,334,883 B1 *  5/2022 Auerbach ............. G06Q 20/223
11,516,186 B1 * 11/2022 Ambaliya ........... H04L 63/0428
11,516,253 B1 * 11/2022 Van Deman, V ....... H04L 63/10
11,539,532 B2 * 12/2022 Zeh ......................... H04L 9/0894
2009/0217041 A1 *  8/2009 Ramzan ................. H04L 9/3257
                                                                    713/168
2014/0359288 A1 * 12/2014 Jensen ................... H04W 12/04
                                                                    713/168
2015/0358161 A1 * 12/2015 Kancharla ............. H04L 9/3234
                                                                    713/164
2017/0357496 A1 * 12/2017 Smith .................... H04L 9/0662
(Continued)

FOREIGN PATENT DOCUMENTS

CN            103997405 B  * 10/2017
EP             4068685 A1  * 10/2022  ............... H04L 9/30
(Continued)

OTHER PUBLICATIONS

T. Visegrady, S. Dragone, and M. Osborne (Stateless cryptography for virtual environments); pp. 10 IBM J. Res. & Dev. vol. 58 No. 1 Paper 5 Jan./Feb. 2014.*

*Primary Examiner* — Andrew J Steinle
*Assistant Examiner* — Ali H. Cheema
(74) *Attorney, Agent, or Firm* — Foley & Lardner LLP

(57) ABSTRACT

Presented herein are techniques for establishing data provenance by generating one-time signatures. In examples, systems may include one or more hardware processors that receive, via an application programming interface (API), a request for a one-time signature and data associated with the request, provide a seed identifier and the data associated with the request to an HSM in a set of HSMs, and receive a response message from the HSM, the response message including a one-time signature. In examples, the response message and the one-time signature are provided to the device that transmitted the request for the one-time signature and the data associated with the request.

20 Claims, 7 Drawing Sheets

(56) References Cited

U.S. PATENT DOCUMENTS

| | | | |
|---|---|---|---|
| 2018/0183602 A1* | 6/2018 | Campagna | H04L 9/14 |
| 2018/0183771 A1* | 6/2018 | Campagna | H04L 63/061 |
| 2018/0183774 A1* | 6/2018 | Campagna | H04L 9/3247 |
| 2019/0172047 A1* | 6/2019 | Tan | G06F 21/32 |
| 2019/0238333 A1* | 8/2019 | Grubin | H04L 9/0833 |
| 2019/0319798 A1* | 10/2019 | Chalkias | H04L 9/3236 |
| 2019/0319804 A1* | 10/2019 | Mathew | G09C 1/00 |
| 2019/0342079 A1* | 11/2019 | Rudzitis | G06F 21/602 |
| 2020/0084050 A1* | 3/2020 | Mensch | H04L 9/3263 |
| 2020/0228338 A1* | 7/2020 | Bowness | H04L 9/3213 |
| 2020/0236113 A1* | 7/2020 | Monica | H04L 9/50 |
| 2021/0326442 A1* | 10/2021 | Campagna | H04L 63/067 |
| 2022/0086009 A1* | 3/2022 | Vacek | H04L 9/3239 |
| 2022/0385484 A1* | 12/2022 | Behnia | H04L 9/0869 |
| 2023/0033630 A1* | 2/2023 | Liu | H04L 9/0866 |
| 2023/0038949 A1* | 2/2023 | Kido | G06F 21/73 |
| 2023/0058273 A1* | 2/2023 | Sundar | H04L 9/0819 |
| 2023/0299972 A1* | 9/2023 | Villatel | H04L 9/3247 |
| | | | 713/176 |
| 2023/0318808 A1* | 10/2023 | Osborn | H04L 9/0877 |
| | | | 713/171 |
| 2024/0097913 A1* | 3/2024 | Laing | H04L 9/3247 |
| 2024/0097914 A1* | 3/2024 | Laing | H04L 9/0643 |

FOREIGN PATENT DOCUMENTS

| | | | | |
|---|---|---|---|---|
| JP | 2003069560 A | * | 3/2003 | |
| WO | WO-2022136527 A1 | * | 6/2022 | G06F 21/316 |
| WO | WO-2022211899 A1 | * | 10/2022 | H04L 9/0825 |

* cited by examiner

US 12,231,580 B1

SYSTEMS AND METHODS FOR ESTABLISHING DATA PROVENANCE BY GENERATING ONE-TIME SIGNATURES

TECHNICAL FIELD

This application generally relates to techniques for establishing data provenance and, in some embodiments, to techniques for generating one-time signatures.

BACKGROUND

Conventional approaches to establish provenance when communicating between devices focused on protecting multiple custodian vaults in accordance with industry standards. More specifically, these approaches focused on securing the custodian vault in which the keys were stored independent of the management of the key lifecycle. To establish secure vaults, keys would be imported into a hardware security module (HSM) or, in some cases, stored on a local device. This creates inefficiencies in that, when keys are imported into an HSM, the HSM must be partitioned such that keys associated with an organization are not mixed with keys of another organization. And keys stored on a local device can be subject to increased vulnerability.

In other conventional approaches, key ceremonies have been established for certificate management at a certificate authority (CA) level. These key ceremonies were established to enable a third party vendor to provide auditability and oversight when communicating with other parties (e.g., users interacting with the third-party vendors over unsecure channels such as the Internet). But key ceremonies that are implemented by an organization (e.g., an organization that is self-signing their certificates) can raise concerns because the trust relationship may not be as well established as those established with CAs. This can be particularly concerning as more organizations look to leverage distributed ledger technology (DLT) in lieu of, or in addition to, current channels.

Referring now specifically to DLT, by virtue of this technology, parent data protection keys are needed when generating new child data protection keys. This is important when establishing provenance on a distributed ledger when using the hash of the child data protection key (commonly called an address). Conventional HSMs are architecturally difficult to interoperate, are not cost effective, are not reusable, and do not provide full operational security when derived data protection keys are used. Due to the operational inefficiencies in conventional HSM architectures, security can be compromised when moving keys outside of HSM in response to the frequent calls that are established as required by DLT designs.

Cryptographic standards and architectures are well defined but not optimally leveraged. More specifically, all of the DLT cryptographic algorithms are well defined by the Internet Engineering Task Force (IETF) Requests for Comments (RFCs), but conventional HSMs are not able to implement these algorithms or provide the out of box cryptographic services or features by design using APIs. And there are currently no Federal Information Processing Standards (FIPS) 140-2 LEVEL 3 or similar International Organization for Standardization (ISO) certifications for HSMs to enforce key management and cryptographic data protection operations fully performed by the HSM. Additionally, there are currently no legal assurances for Digital Assets business owners when they use HSMs for DLT-specific algorithms. This is because the security requirements and validation controls against tampering of DLT algorithms and the generated DLT keys (encrypted or otherwise) have not fully flown into these Federal Information Processing Standards (FIPS) 140-2 LEVEL 3 or ISO Cryptographic Module Validation Program (CMVP) such as ISO 24759 and ISO 19790 standards certification process. Consequently, these DLT designs are prone to crypto-damage and loss of availability of business-critical data without a certified HSM and the industry has seen a subsequent rise in insider threats and lateral movements because of human-access dependent approach taken to secure the encrypted key blobs outside the tamper proof secure boundary.

Because of the risks involved, there is a need to shift the focus away from protecting custodial vaults described above and improve protection of keys used to access and leverage the vaults. And conventional HSMs and HSM configurations cannot scale to address emerging technologies such as DLT.

SUMMARY

Provided herein are systems and methods that improve on conventional techniques for generating signatures. More specifically, computing systems and techniques are disclosed that involve receiving requests for one-time signatures from devices (e.g., client devices), the requests comprising data to use when generating the one-time signatures.

Systems and methods described herein can establish data provenance by generating one-time signatures can include systems that receive a request for a one-time signature and data associated with the request. The request can be transmitted by a client device (e.g., a device associate with a user involved in a transaction) to the system. The system can then determine an HSM from among a plurality of HSMs within a signing environment and provide data to the HSM to cause the HSM to generate the one-time signature. The one-time signature may include components that, when received by devices other than the system and the device requesting the one-time signature, enable the devices to recover a public key corresponding to the private key involved generating the signature. Once generated, the HSM may return the one-time signature to the system, which in turn provides the one-time signature to the client device. The client device can then use the one-time signature to establish the provenance of the data associated with the one time signature. More specifically, the client device can recover a public key from the one-time signature and the client device can then use the public key to validate that the signature was generated using the corresponding private key. In an example, the client device can recover the public key from signature and use the public key to establish ownership of a corresponding private key that was involved in signing the data. This enables the client device to establish the integrity of the data that was signed. This is particularly beneficial in that, by virtue of the relationship between the client device, the system, and the HSMs, the client device can make a simple API call and, in response to the call, receive the one-time signature.

In an embodiment, a computer-implemented method includes: receiving, via an application programming interface (API) request, a request for a one-time signature and data associated with the request; determining an HSM identifier and a seed identifier for a seed according to an account associated with the request; providing the seed identifier associated with the seed to an HSM corresponding to the HSM identifier, the HSM included in a set of HSMs; receiving from the HSM a response message having the one-time signature for the data associated with the request, the one-time signature based on a one-time private key derived from the seed; and transmitting a one-time public key and the response message having the one-time signature for the data associated with the request in response to the request.

The method may include providing, by the at least one processor, the seed identifier and at least one identifier to the HSM corresponding to the HSM identifier. The HSM identifier may be a globally unique identifier for deriving the one-time key from the seed to generate the one-time signature. The at least one identifier may be associated with one or more of: the account associated with the request, an identifier associated with a device involved in managing the account associated with the request, or an identifier associated with the device that transmitted the data associated with the request for the one-time signature.

The method may include determining the seed based at least in part on a random number generator. The method may include initiating a key exchange with a remote device that is associated with the account. Determining the HSM identifier may include: selecting the HSM identifier from among a plurality of HSM identifiers. Determining the seed identifier to generate the one-time signature may include determining the seed identifier based on a mapping to an account of a plurality of accounts.

The method may include determining, by the at least one processor, a seed value for each HSM included in a set of HSMs. The account corresponding to the seed may include at least one of a user or a software application.

In yet another embodiment, disclosed is a system at least one processor programmed to: receive, via an application programming interface (API) request, a request for a one-time signature and data associated with the request; determine a hardware security module (HSM) identifier and a seed identifier for a seed according to an account associated with the request; provide the seed identifier associated with the seed to an HSM corresponding to the HSM identifier, the HSM included in a set of HSMs; receive a one-time public key from the HSM based on the HSM deriving a pair of one-time keys from the seed and the HSM identifier, and a response message having the one-time signature for the data associated with the request; and transmit the one-time public key and the response message having the one-time signature for the data associated with the request in response to the request.

In another embodiment, a non-transitory machine-readable storage medium is disclosed, the non-transitory machine-readable storage medium including computer-executable instructions stored thereon that, when executed by one or more processors, cause the one or more processors to: receive, via an application programming interface (API) request, a request for a one-time signature and data associated with the request; determine a hardware security module (HSM) identifier and a seed identifier for a seed according to an account associated with the request; provide the seed identifier associated with the seed to an HSM corresponding to the HSM identifier, the HSM included in a set of HSMs; receive a one-time public key from the HSM based on the HSM deriving a pair of one-time keys from the seed, and a response message having the one-time signature for the data associated with the request; and transmit the one-time public key and the response message having the one-time signature for the data associated with the request in response to the request.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate one or more embodiments and, together with the specification, explain the subject matter of the disclosure.

DETAILED DESCRIPTION

Figure 1:
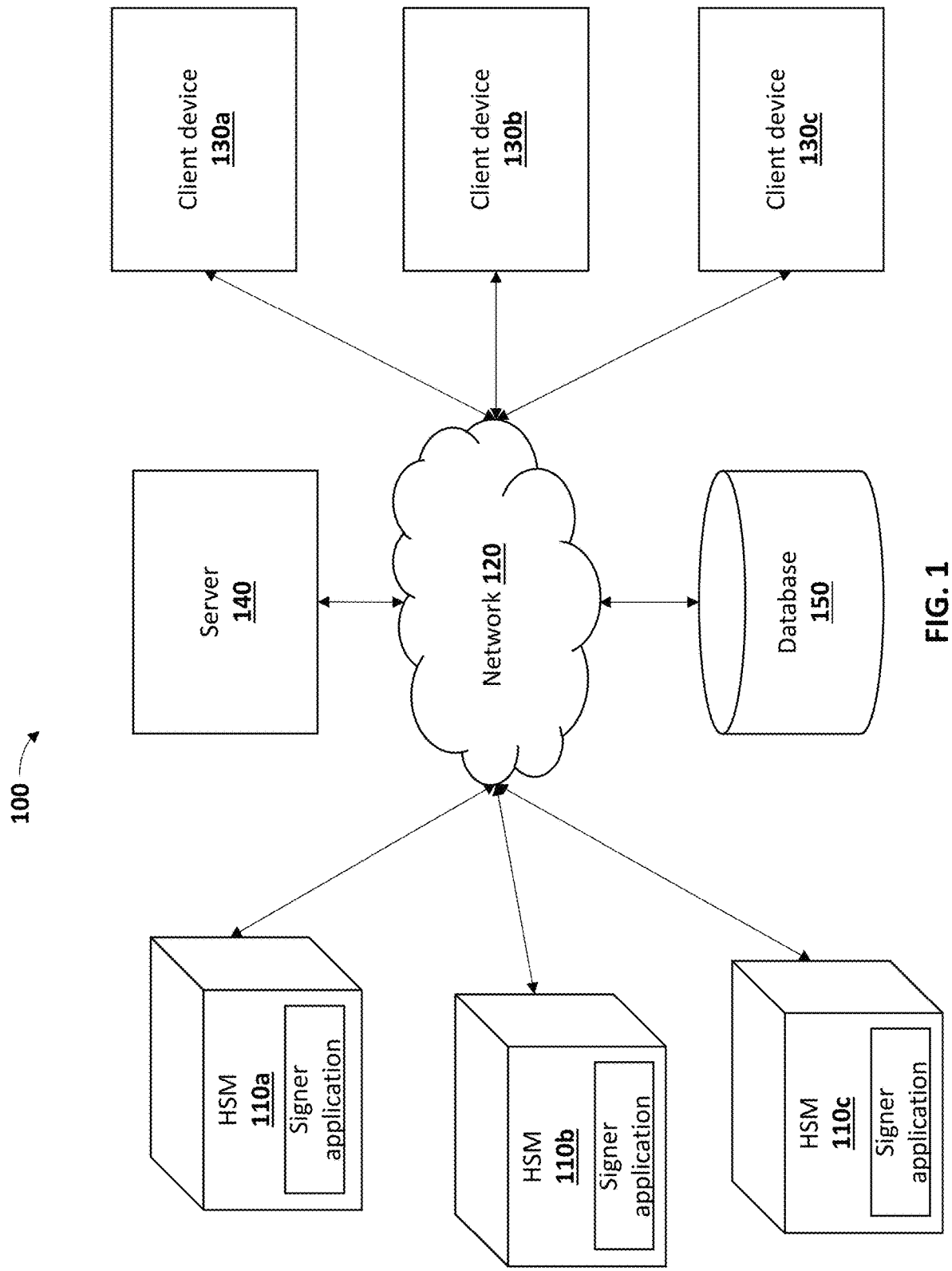
FIG. 1 is a block diagram of a network environment, in accordance with one or more embodiments.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Conventional techniques and technological solutions available today do not include systems, tools, or platforms that are capable of managing the signature generation process in a distributed computing environment. More specifically, systems, tools, or platforms that are currently available are incapable of binding an identity of an account to a public key, binding that identity to keys and/or seeds used in the signature generation process, and authenticating the identity of the account to perform cryptographic operations using the public key and/or seed generated during the signature generation process. And continued implementation of conventional techniques requires significant computational resource overhead.

To address the challenges described, techniques described herein involve establishing a signing environment within a secure environment to enable coordination across multiple hardware security modules (HSMs) when generating one-time signatures. More specifically, techniques described herein involve: receiving, via an application programming interface (API) request, a request for a one-time signature and data associated with the request; determining a HSM identifier and a seed identifier for a seed according to an account associated with the request; providing the seed identifier associated with the seed to an HSM corresponding to the HSM identifier, the HSM included in a set of HSMs; receiving a one-time public key from the HSM based on the HSM deriving a pair of one-time keys from the seed and the HSM identifier, and a response message having the one-time signature for the data associated with the request; and transmitting the one-time public key and the response message having the one-time signature for the data associated with the request in response to the request.

By implementing the techniques described herein, systems (e.g., servers and/or the like) can be configured to operate within a signing environment to receive requests for one-time signatures, coordinate the generation of the one-time signatures with HSMs within the signing environment that map to the requests, obtain the resulting one-time signatures from the HSMs, and return the one-time signatures to the devices that requested the one-time signatures. As a result, a single signing environment may be established to provide one-time signatures responsive to the requests where the requests come from devices associated with one or more disparate individuals or organizations. This, in turn, eliminates the need to partition HSMs from one another within a signing environment, as the HSMs operate in a stateless manner. And as a result of having the one-time signatures generated within a signing environment, the devices requesting the one-time signatures may be enabled to establish their provenance when interacting with, for example, a distributed public ledger.

Further, by establishing a signing environment that is protected by a secure environment, the keys used to generate the one-time signatures can be protected from potentially being compromised or lost. For example, as described above, key pairs can be derived from seed values that are mapped to accounts involved in a request for a one-time signature by a corresponding HSM. As a result, private keys involved in the signature process never have to be exported from the HSM and, as a result, cannot be compromised. By virtue of the careful mapping of devices to corresponding accounts (e.g., at the organization level, at the individual level within the organization, and/or the like), HSMs can be added or removed from the signing environment as necessary, such as circumstances for addressing increases or decreases in demand for one-time signatures without the possibility of data loss (e.g., should an HSM fail). Further, the HSMs in the signing environment may be capable of deriving one-time hardened keys according to a level of entropy as necessary. In many circumstances, such one-time hardened keys (particularly with relatively higher entropy) might not be capable of being generated, for example, by conventional HSMs, HSM environments, or other types of hardware and software for managing cryptographic keys or certificates that might be installed on certain devices.

Even more, by virtue of the implementation of the techniques described herein, the present disclosure enables the implementation of secure and up-to-date industry standard compliant cryptographic operations for all DLT use cases. In one example, one-time signatures are generated and used by nodes of a DLT system for signing blocks. More specifically, the one-time signatures can be generated for transaction proposals to be added to a shared ledger. In examples, the transaction proposals can be transmitted to the DLT systems by devices associated with users, and nodes of the DLT systems can sign the transaction proposals before the transaction proposal is added to a block. Additionally, or alternatively, the block can be signed using a one-time signature generated in accordance with the presently-disclosed techniques. The present disclosure enables the protection an organization's (enterprise's) digital assets while simultaneously abstracting the management and operations of data protection keys protecting those assets. Beneficially, the present disclosure provides operational guarantees, secure key management operations, and interoperability options for any use of data protection keys in DLT application architectures.

Because DLT technologies and regulatory obligations often require the computing systems to implement demanding data protection private signatures algorithms, increasing the scale at which DLT technologies are implemented may the drain on the computational resources available to an organization and increase the potential for delays or failures. To address this, an organization may implement specialized HSMs designed to efficiently handling demanding data protection private signature operations. To address the scalability concerns associated with these HSMs (noted above) the techniques described provide functionality that augments the capabilities of HSMs and improves the enterprise architecture when handling cryptographic assets.

The present disclosure describes techniques that, when implemented, enable the use of standardized API calls across disparate applications when interacting with a set of HSMs and cryptographic assets. These API calls include API calls for requesting cryptographic data protection keys (e.g., public keys) and certificates. The present disclosure also describes techniques by which HSMs can generate all DLT-specific cryptographic data protection keys and derive one-time child keys within the secure boundary of an HSM. Generating the one-time hardened keys beneficially protects cryptographic data protection keys required by for interaction with any DLT. The present disclosure provides techniques that allow for the identification and differentiation of all HSMs using mathematical determinism. This determinism enables a unique key to be derived every time an HSM is switch (e.g., removed, replaced, added, and/or the like) so no known cryptographic collision of derived keys can occur when deriving the one-time use hardened child keys for the data protection of transactions.

Further, systems implementing the techniques described herein may be operated in accordance with a stateless design, fostering zero trust architecture principles where verifications are based on zero knowledge proofs. The design enables autoscaling HSMs as well as parallel HSM processing and efficient key management operations, while the unique identifiers (IDs) and seeds ensure the HSMs consistently produce secure and unique one-time hardened child keys, avoiding collisions between private keys used for generating one-time signatures, regardless of the number of HSMs are added to the architecture. The techniques described herein provide address the complex data protection specific cryptographic algorithms required by the DLT technologies when, for example, instructing the HSMs to derive and deploy the one-time hardened child keys in accordance with elliptical curve (or other complex) asymmetric encryption algorithms including RFC 7519. Moreover, the one-time hardened child keys can be used to generate ledger addresses or perform other DLT functions, such as distributing one-time hardened public keys or the DLT public addresses for on-chain or on-ledger entries. Because the one-time hardened child keys are non-deterministic and collision resistant, the address of each transaction will never repeat again on network chain/on the network ledger, which eliminates revelation of operational patterns and further threats due to a passive advance persistent threats already existing on the network used to engage with DLTs.

FIG. 1 is a block diagram of an environment 100, in accordance with one or more embodiments. The environment 100 may include hardware security module (HSM) 110a, HSM 110b, and HSM 110c, referred to collectively as HSMs 110. The HSMs 110 may be in communication with a server 140 via a network 120. In some embodiments, the connections associated with the HSMs 110 can be associated with a transport protocol that involves (e.g., requires and/or the like) static Internet Protocol (IP) address assignment such that one or more devices are not in communication with the HSMs. The network 120 may be a Wide Area Network (WAN), such as the internet, or any kind of network. The server 140 may be in communication with client device 130a, client device 130b, and client device 130c, referred to collectively as client devices 130. The server 140 may receive data from the HSMs 110 and/or the client devices 130.

The HSMs 110 include any computing device comprising hardware and software components capable of performing the various processes described herein. For example, the HSMs 110 may be any device including a processor, which may include a secure cryptoprocessor (e.g., a specialized processor that performs cryptographic operations, sometimes referred to as a hardware security engine (HSE)); and non-transitory machine-readable memory, which may include a secure memory (e.g., tamper-proof memory that can be volatile (e.g., DRAM) or non-volatile (flash) memory that stores cryptographic keys, the tamper-proof memory being capable of detecting attempts to tamper with the memory and erasing itself in the event of detected tampering). The HSMs 110 may further include software and hardware components of a random number generator and, in some embodiments, a tamper-resistant housing. The HSMs 110 may be capable of communicating, via the network 120, with one or more other devices of FIG. 1. Additionally, or alternatively, the HSMs 110 may be capable of communicating only with one or more servers 140 via the network 120, which may include communications via one or more wired or wireless connections with the one or more servers 140. In some embodiments, the HSMs 110 may be configured to only communicate with one or more certain devices of FIG. 1. For example, the HSMs 110 may be configured to only communicate with one or more client devices 130, the server(s) 140, and/or the computing device(s) hosting database(s) 150. As another example, the HSMs 110 may be configured to communicate only with the particular server 140 and the database 150. In this example, the HSMs 110 may be in direct wired or wireless communication with the server 140 and the database 150. In examples, the HSMs 110 may establish secure communication with the server 140 and/or the database 150 via network 120. In some embodiments, each HSM 110 is associated with (e.g., has installed thereon) a signer application that implements one or more of the functions described herein. In some embodiments, the HSMs 110 are individually or collectively associated with one or more financial institutions, described herein.

The client devices 130 include any computing device comprising hardware and software components capable of performing the various processes described herein. For example, the client devices 130 may be any device including a memory and a processor capable of communicating, via the network 120 with one or more other devices of FIG. 1. Non-limiting examples of the client devices 130 include desktop computers, mobile devices (e.g., cellular phones and tablets), and/or the like. The client devices 130 are configured to be in communication with HSMs 110 and server 140 via network 120. In some embodiments, the client devices 130 provide (e.g., transmit) data to the HSMs 110 (e.g., via the server 140) to cause the HSMs 110 to generate one-time signatures as described herein. In some embodiments, the client devices 130 are associated with individuals (e.g., users), public and/or private companies, public and/or private financial institutions, government institutions, and/or the like. And in embodiments, the client devices 130 work in coordination with, or otherwise control, corresponding HSMs 110, either directly or via the server 140, to perform one or more of the operations described herein.

The server 140 includes any computing device comprising hardware and software components capable of performing the various processes described herein. For example, the server 140 may be any device including a memory and processor capable of communicating, via the network 120 with one or more other devices of FIG. 1. Non-limiting examples of the server 140 includes data centers, server computers, workstation computers and/or the like. The server 140 is configured to be in communication with the HSMs 110 and the client devices 130 via network 120. The server 140 obtains (e.g., receives) data from the HSMs 110 and the client devices 130 and the server 140 provides (e.g., transmits) the data to respective devices in accordance with the techniques described herein. In some embodiments, the server 140 is associated with one or more individuals, public and/or private companies, public and/or private financial institutions, government institutions, and/or the like. It should be appreciated that certain functions and executable software operations described with respect to the server 140 may be performed one or more other devices of the system 100, such as the various HSMs 110. For example, the functions provided by the services and functions of the server 140 may be abstracted and extensible. In this example, the software functions and features of the server 140 extends the HSM 110 security boundary to include the various security critical code and data, which executes or is used within the secure environment of the HSMs 110. In some implementations, certain portions of the security application code and functions are loaded on and executed by one or more HSMs 110.

The database 150 includes any computing device comprising hardware and software components capable of performing the various processes described herein. For example, the database 150 may be any device including a memory and processor capable of communicating, via the network 120 with one or more other devices of FIG. 1. Non-limiting examples of the database 150 includes data centers, server computers, workstation computers and/or the like. The server 140 is configured to be in communication with the HSMs 110 and the client devices 130 via network 120. The database 150 may obtain (e.g., receive) data from the HSMs 110, the client devices 130, and/or the server 140. In some embodiments, the database 150 is associated with (e.g., under the control of) the client devices 130, the server 140 and/or one or more financial institutions described herein.

The data described herein may include transaction data associated with a transaction (e.g., a transaction involving one or more individuals such as customers), messages (e.g., messages sent by a client device 130 to server 140), user data associated with a user (e.g., a customer, an individual associated with a financial institution such as an employee, and/or the like), customer data associated with one or more prior transactions (e.g., transactions involving users), account data associated with one or more accounts (e.g., accounts associated with users, accounts associated with prior transactions, and/or the like), prior transaction data associated with one or more prior transactions, payment device details associated with one or more payment devices (e.g., one or more payment cards such as credit cards and debit cards, online credit cards, cards associated with virtual wallets, and/or the like), email data associated with one or more email addresses, document data associated with one or more documents, recording data associated with one or more telephone calls, external data associated with one or more reporting organizations (e.g., credit monitoring services and/or the like), and public data associated with one or more publicly available data sources (e.g., news sources, agencies, and/or the like). In some embodiments, the data described herein may include data associated with Javascript Object Notation (JSON) web tokens (JWTs), JSON web keys (JWKs), certificates as described herein identifying parameters needed to generate one-time signatures, and/or the like. In some embodiments, the data described herein can include any data generated (e.g., by the client devices 130) for which a one-time signature is desirable.

The database 150 may be associated with various entities. For example, the database 150 may be associated with any type of enterprise computing infrastructure (e.g., governmental computing system, academic computing system, commercial computing system), one or more individuals, public and/or private companies, public and/or private financial institutions, government institutions, and/or the like. The database 150 may include transaction data for the various entities. The database 150 may be located in various different jurisdictions and/or contain types of data relevant to particular jurisdictions. The data stored in the databases 110 may be tagged with or include a parameter indicating from which jurisdiction and/or from which device of FIG. 1 the database 150 received the data. In some implementations, the data and/or the data entries of the database 150 may differ in format based on from which database and/or jurisdiction the server 140 receives the data records. The data records may include any of the data described herein. In some implementations, the database 150 may include data associated with demographic information of a customer, including place of residence, citizenship, and other demographic information.

The database 150 may include data records from multiple jurisdictions and multiple financial institutions. Data records from different jurisdictions and/or financial institutions may have a variety of formats. The data records from the multiple jurisdictions and/or multiple banks may be stored in a single database 150 or in separate databases (not explicitly illustrated). User input may be used to configure the storage of the data records in the database 150. In an example, user input may be used to store data records from different banks in different databases of the database 150. In an example, user input may be used to store data records from different jurisdictions in different databases. Storage of the data records may be configurable, with data records stored in different databases based on bank, business area, user type, access level, geography, jurisdiction and/or tax report type. In an example, the server 140 may instruct the database 150 to store data records from a specific bank in separate databases based on jurisdiction. User access rules may be applied to the database 150. In this way, the server 140 can be used to obtain data associated with one or more potentially suspicious activities described herein that would otherwise be unobtainable due to access restrictions imposed by each individual financial institution associated with the database 150.

Figure 2:
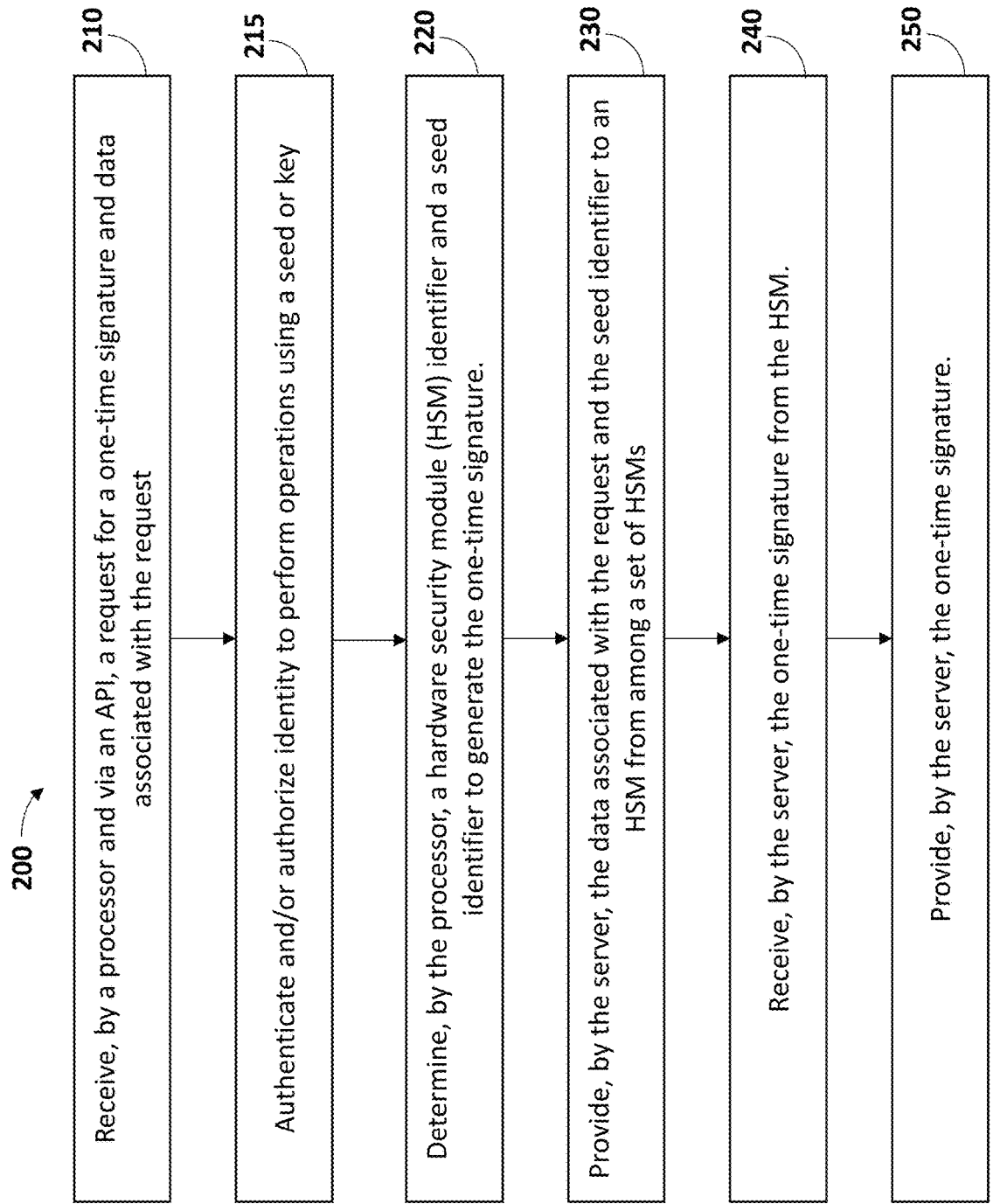
FIG. 2 is a flow chart illustrating operations of a method for signing data in a computing system, in accordance with one or more embodiments.
Figure 3A:
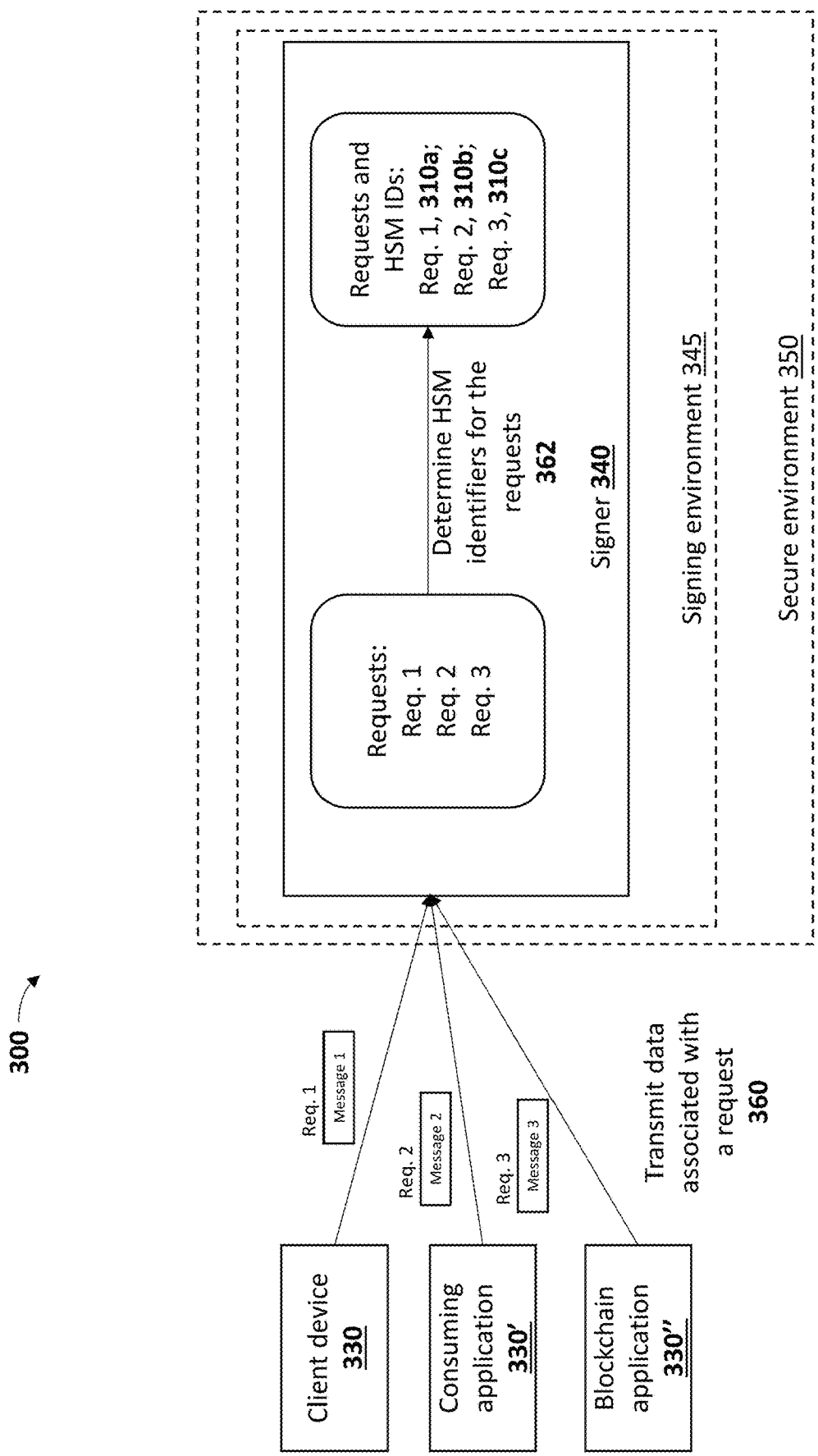
FIGS. 3A-3E illustrate a non-limiting example of an implementation of techniques for signing data in a computing system, in accordance with one or more embodiments.
Figure 3B:
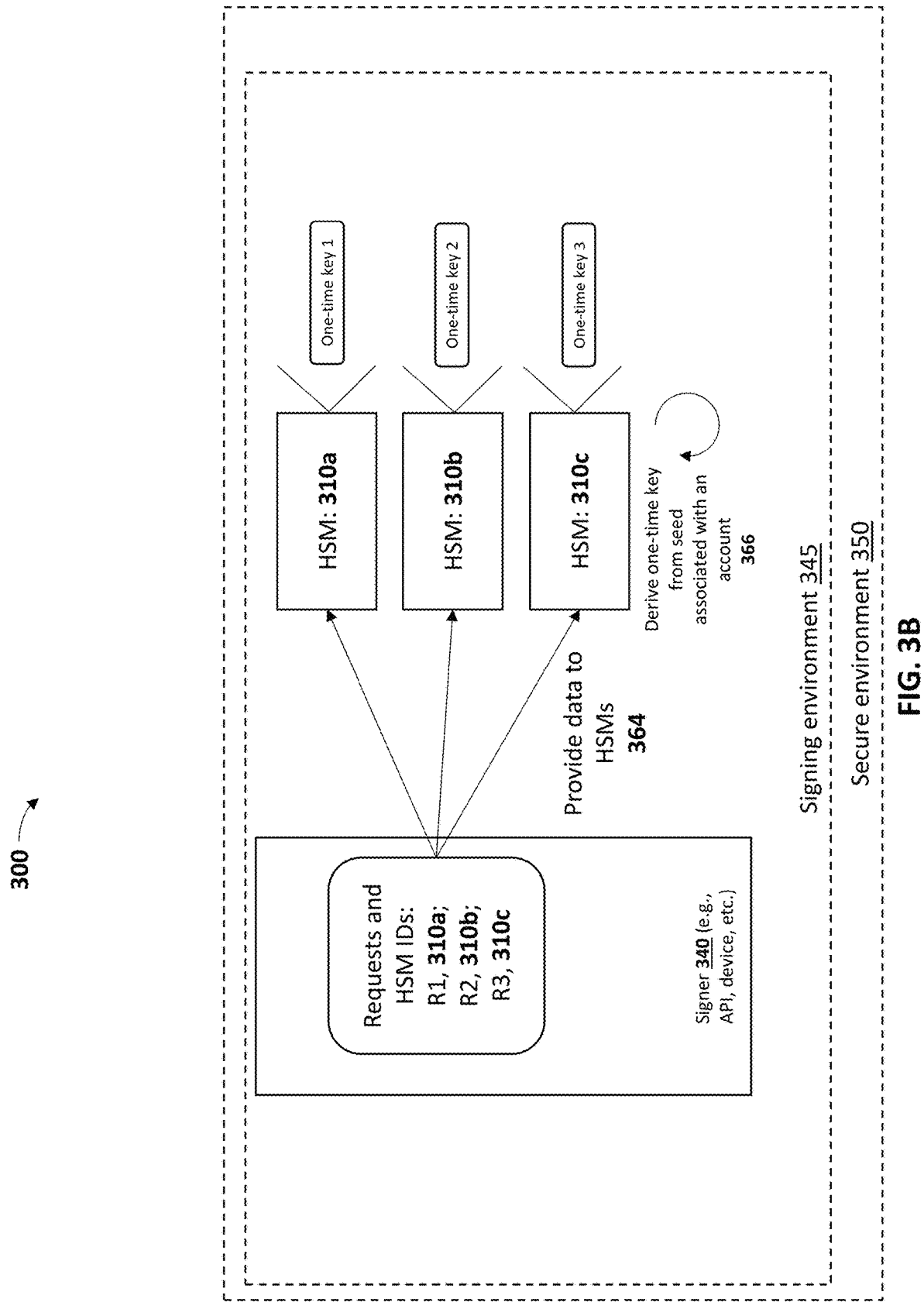
Figure 3C:
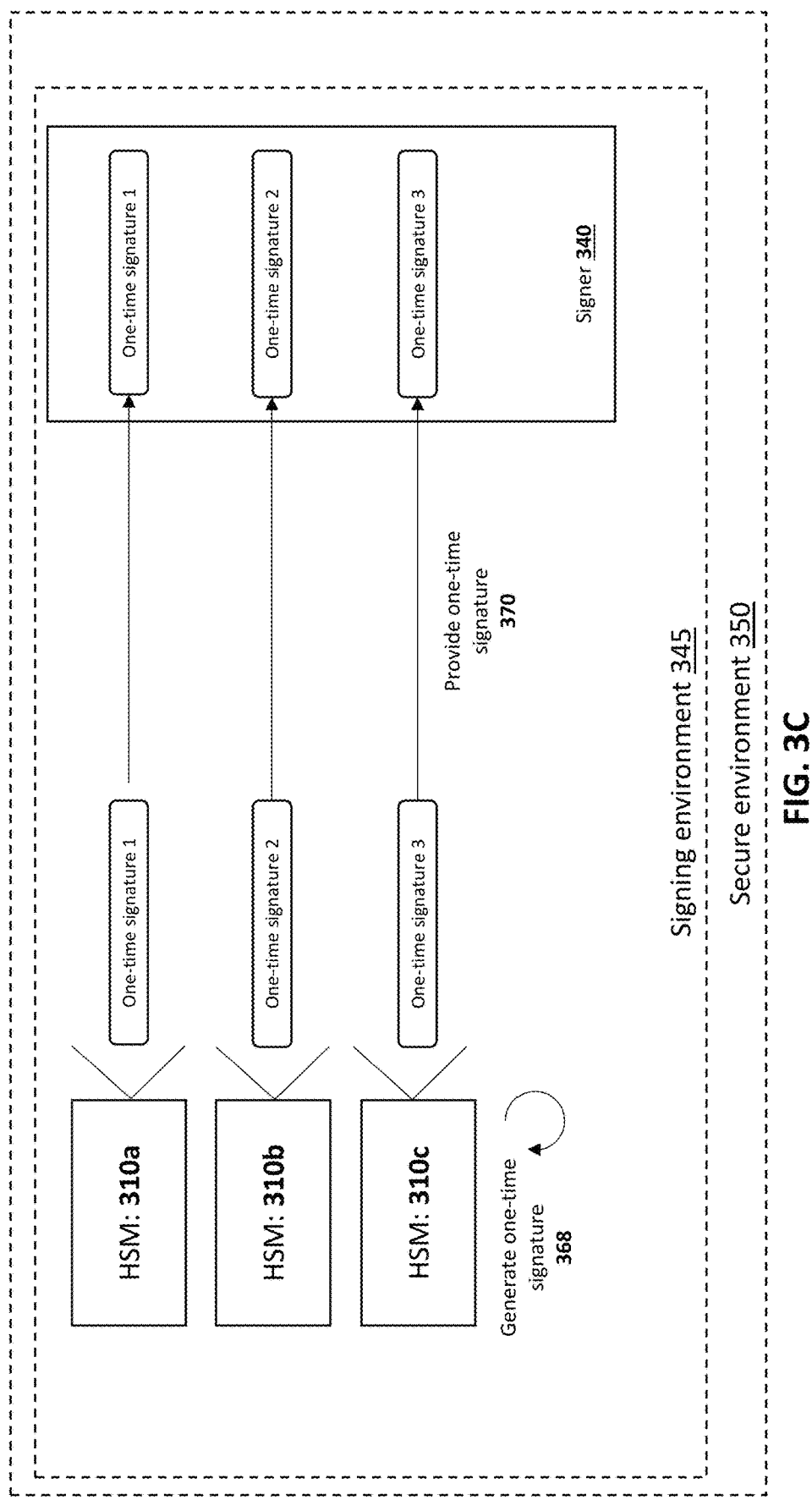
Figure 3D:
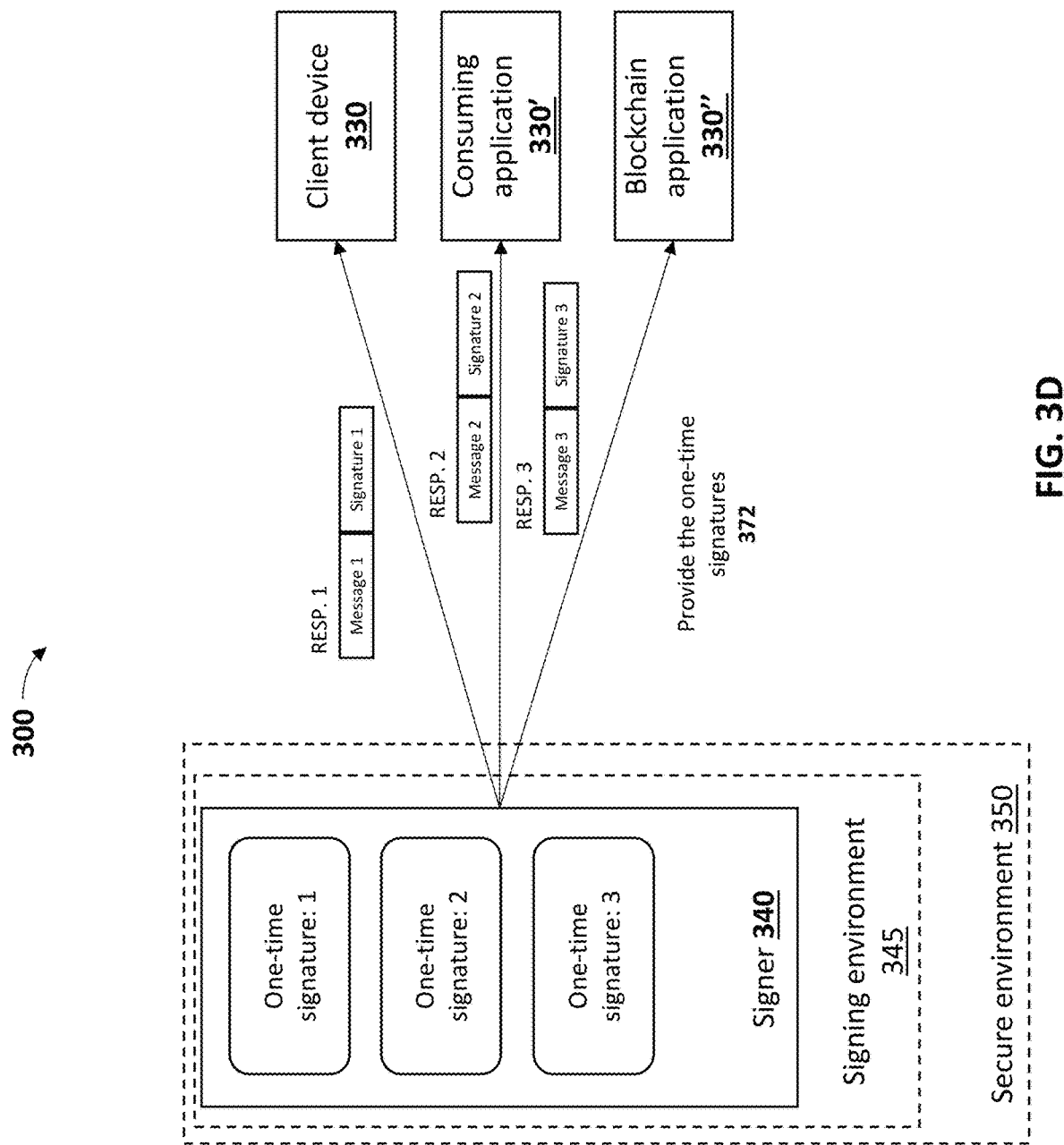
Figure 3E:
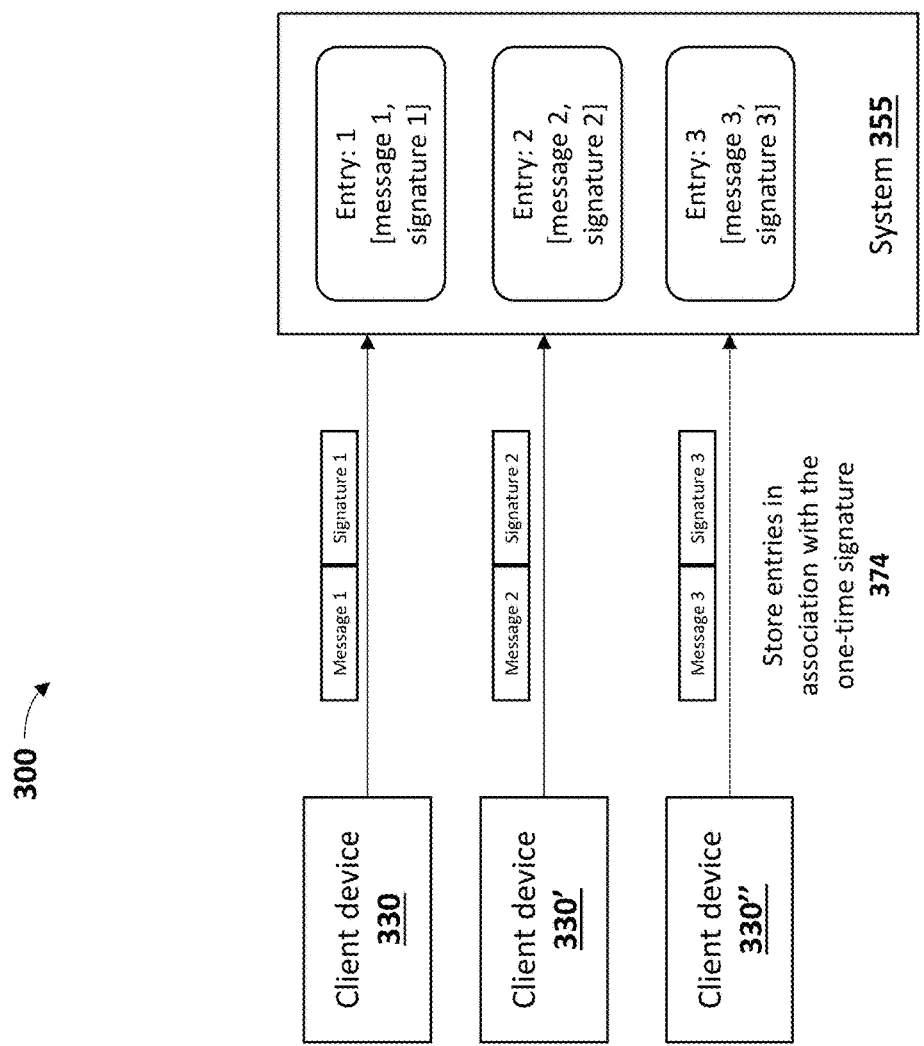

FIG. 2 is a flow chart illustrating operations in a method 200 for generating one-time signatures. The method 200 may include more or fewer operations than shown. The operations shown may be performed in the order shown, in a different order, or concurrently. The method 200 may be performed by the server 140 of FIG. 1. Additionally, or alternatively, one or more operations involved in performing the method 200 may be performed by a device different from, or in coordination with, one or more of the server 140, including one or more of the HSMs 110, one or more of the client devices 130 and/or the database 150. In some implementations, client devices that are not in direct communication with the server are referred to as remote devices.

At operation 210, a server (e.g., a server that is the same as, or similar to, the server 140 of FIG. 1) receives, via an API, a request for a one-time signature and data associated with the request. The server may receive the request for the one-time signature and the data associated with the request via an API, where the API specifies one or more fields that correspond to information needed to generate the one-time signature. The API fields may include, for example, an identifier associated with a client device (e.g., a client device that is the same as, or similar to, one or more of the client devices 130 of FIG. 1), a public certificate associated with the client device, an account identifier associated with a user and/or the client device, and/or the like.

At operation 215, the server may optionally authenticate and/or authorize identity to perform operations using a seed or key. For example, the server may authenticate the identity of an individual and/or a device involved in a request for a one-time signature. For example, the server may authenticate the identity of the individual and/or the device involved in the request based on the server determining whether the request was encrypted in accordance with a predetermined encryption scheme (e.g., specified by the API implementation involved in the communication between the server and the client device). In examples, when the server determines that the request was encrypted in accordance with the predetermined encryption scheme indicating that the request was transmitted from the client device, the server may authenticate and/or authorize the request.

In some implementations, the identifier associated with the client device, which may include an entity identifier corresponding to an entity in control of the client device such as an account identifier and/or the like) may be mapped to one or more accounts. For instance, where the server is associated with an organization (e.g., a financial institution) that manages one or more accounts within a hierarchy of accounts, the identifier associated with the client device may be mapped to the one or more accounts within the hierarchy. In some cases, where the client device is associated with an account holder associated with multiple accounts (e.g., a checking account, a savings account, an exchange-traded fund (ETF) account, and/or the like), the identifier associated with the entity (or, in some embodiments, the client device) may map to a first account that further maps to one or more accounts of the multiple accounts. In this way, the server may receive requests for one-time signatures that map between the device that requested the one-time signature and the corresponding account involved in the generation of the one-time signature.

In some implementations, the request for the one-time signature is associated with a request from a user to store data on a system (e.g., a server, a distributed ledger system, a blockchain system, and/or the like). For example, the client device may receive input from a user involved in a transaction. The transaction may be a virtual transaction involving the client device and one or more different devices. In some examples, the transaction is a distributed ledger-based transaction, where the client device provides data to be stored on a distributed ledger. In these examples, the data associated with the transaction may be stored in association with the one-time signature. In examples, the data may be updated (e.g., hashed) and stored in association with the one-time signature on the system.

In many cases, the data associated with the request is transmitted to the server from the client device. When a user provides input to a client device to participate in (e.g., generate data associated with) a transaction, the client device may receive the input and provide data associated with the input to a client application installed on the client device. The client application may include, for example, a digital wallet, a cryptocurrency wallet, and/or the like. The client application may be configured to transmit data via a secure communication connection established between the client device and the server. For instance, the client application may be configured to transmit the data using the secure communication connection such that the data is secured (e.g., encrypted) before being sent to the server. In some implementations, the client application may be involved in a separate and/or prior key exchange with the server. In this way, the client application may generate the data associated with the request for the one-time signature such that the data is protected when transmitted to the server with the request for the server to generate the one-time signatures. In some implementations, the data is transmitted based on the client device receiving a certificate from the server and securing the data based on the contents of the certificate.

In some implementations, the data associated with the request for the one-time signature includes data associated with a public certificate. For example, where the data associated with the request for the one-time signature is transmitted to the server from the client device, the data associated with the request for the one-time signature may be associated with (e.g., correspond to) a public certificate that is stored on the client device. In examples, the public certificate is further mapped to one or more accounts of the user that controls the client device. In some examples, the server generates the public certificate for the entity associated with the user device and provides the public certificate for later use when establishing the identity of the entity controlling the client device (such as an account holder) when transmitting requests for one-time signatures. In these examples, the server may generate the public certificate that represents the mapping between the client device and the account. Generation of the public certificate may be based on at least one of: the Rivest-Shamir-Adleman (RSA) cryptosystem, elliptical curve digital signature algorithms (ECDSA) including those specified by the National Institute of Standards and Technology (e.g., NISTP256, NISTP384, NISTP521), The SECP265kl algorithm identified by the Standards for Efficient Cryptography, and the Edwards-curve Digital Signature Algorithm Ed25519. In other examples, the server generates a public certificate signing request (CSR) and transmits the CSR to a system that generates public certificate such as, for example, a local system involved in self-signing certificates or a system associated with a trusted Certificate Authority (CA). The account may be further associated with both the user controlling the client device and one or more financial institutions where the user maintains accounts. In these examples, the account may be involved in one or more transactions described herein. In some examples (described below) the public certificate may be used to correlate the client device with one or more seeds that the HSMs can use to derive key pairs for generating one-time signatures.

In some implementations, the server determines a set of HSM identifiers. For example, the server may determine a set of HSM identifiers based on the server assigning an each HSM within a given secure environment with a unique HSM identifier. The server may then determine associations between the HSM identifiers and individual HSMs from among a set of HSMs. For example, where the server is coordinating performance of one or more functions (e.g., generation of a one-time signature) performable across a plurality of HSMs, the server may assign the HSM identifiers to distinct HSMs in the set of HSMs. In some examples, the HSM identifiers are static (not updated or reassigned). In some embodiments, the server may determine that an HSM was added to the secure environment (established by the server) and the server may register the HSM. When registering the HSM that was added, the server may install an application (common to all HSMs within the secure environment) that enables the HSM to synchronize with one or more other HSMs in the secure environment. During synchronization, each HSM can communicate with the other HSMs within the secure environment to encrypt and exchange keys therebetween. In this way, the HSMs can be scaled up or down as necessary (e.g., in the case that hardware such as an HSM needs to be replaced, etc.) within the secure environment.

In some implementations, the server establishes a signing environment. For example, the server may establish a signing environment whereby one or more devices associated with the environment can communicate with the server to generate one-time signatures described herein. In an illustrative example, the server may establish a singing environment that includes a plurality of HSMs. In some implementations, the HSMs may be isolated from one another, may be configured to communicate with one another, or may be configured to communicate with the server (or another shared computing resource). In some implementations, the device in the signing environment may be configured to communicate with one or more other devices in the signing environment based on one or more secure communication connections. In some implementations, the secure communication connections as described herein may be based on secure sockets layer (SSL) techniques, transport layer security (TLS) techniques, and/or the like. In some implementations, the secure communication connections may only be established between the signer 340 and devices that are capable of using x.509 certificates (e.g., x.509 certificates used by the signer 340 and issued by a CA as described herein).

In some implementations, the server establishes a secure environment. For example, the server may establish a secure environment where the secure environment includes one or more signing environments 345. In such examples, the server may act as a gateway and manage communications between one or more devices (e.g., client devices, servers associated with other secure environment or signing environments, and/or the like) and the one or more devices included in the corresponding signing environment.

At operation 220, the server determines an HSM identifier and a seed identifier to generate the one-time signature. For example, the server may determine the HSM identifier and the seed identifier based on the request for the one-time signature. In such an example, the server may determine a mapping corresponding to the request for the one-time signature based on the client device that transmitted the request for the one-time signature. The server may then determine the HSM identifier and the seed identifier based on the mapping corresponding to the request for the one-time signature. In some implementations, the HSM identifier is a globally unique identifier. For example, the HSM identifier may be a globally unique identifier for deriving one or more keys from a seed to generate a one-time signature.

In some implementations, the server determines a seed identifier that corresponds to a seed to be used to generate the one-time key based on the account involved in the request to generate the one-time key. For example, before receiving the request, the server may cause the HSMs to generate one or more seeds (e.g., master seeds, seeds derived from the master seeds, and/or the like) for one or more accounts that are mapped to corresponding HSMs. Generation of the seeds may occur based on generation of the account and/or installation of the client application on the client device involved in the request. The server may then receive a seed identifier corresponding to the seed that was generated and update the mapping to represent the relationship between the seed identifier and the accounts associated with the mapping. In this way, the server may determine a correspondence between the seed identifier (and corresponding seed) involved in a given request for a one-time signature and one or more accounts involved in the request based on the seed identifier determined by the server.

In some implementations, the server determines the seed identifiers in response to receiving requests for one-time signatures by client devices. For example, the server may store the seed identifiers in a database (e.g., a database that is the same as, or similar to, the database 150 of FIG. 1) in association with (e.g., included in) the mapping corresponding to the client device that transmitted the request for the one-time signature. As will be discussed below, the server may subsequently store one or more of the public keys (e.g., public keys returned by the HSMs based on generation of corresponding one-time signatures) generated based on the seed identifier for a given request.

In some implementations, the server may map the seed identifier to the account involved (e.g., at creation of the account) from among a plurality of accounts. This process may be repeated as new accounts are mapped to the signing environment (e.g., when created, when a first request for a one-time signature is received and mapped to the account, and/or the like). As will be understood, the mapping may represent relationships between one or more first accounts and one or more second accounts described above, where the one or more first accounts and the one or more second accounts are associated with the device that transmitted the request for the one-time signature. In this way, multiple levels of accounts within a system (e.g., a system implementing a financial account-based model) may each be mapped to a device that is configured to engage in interactions involving accounts at each level of the mapping. In some implementations, the mapping may also represent relationships between devices and domains. For example, where one or more client devices are associated with a first domain (e.g., the one or more client devices are controlled by an individual or organization) the one or more client devices may be represented in the mapping as related to one or more domains. In this way, the server may maintain a mapping between the client device and the HSMs as the mappings correspond to particular requests received from the client device for one-time signatures.

In some implementations, the server may determine seed values for one or more HSMs. For example, the server may determine seed values for one or more HSMs from among a plurality of HSMs in a signing environment. In examples, the server may cause the HSMs to determine the seed values. For example, the server may cause the HSMs to determine the seed values based on (e.g., using) a random number generator implemented by the HSMs. Examples of random number generators include linear feedback shift registers (LFSRs), Elliptic Curve Random Number Generators (ECRNGs), SHA-based pseudorandom number generators, hardware random number generators, and/or the like. In some implementations, the server may determine the seed values based on the server generating the one or more seed values and assigning the one or more seed values. Similarly, in this example, the server may determine the one or more seed values using a random number generator.

At operation 230, the server provides the data associated with the request and the seed identifier to an HSM from among a set of HSMs. For example, the server can provide (e.g., transmit and/or otherwise make available for download) the data associated with the request and the seed identifier to an HSM from among the set of HSMs. In this example, the server may provide the data associated with the request and the seed identifier the HSM based on the server determining the HSM identifier corresponding to the HSM. While the generation of one-time signatures based on the data associated with the request and the seed identifier will be discussed with respect to a one-time signature, embodiments are not so limited. For instance, in some embodiments, the server receives one or more subsequent requests for one-time signatures, and then the server may determine that one or more child seeds may be selected and provided by the server to a device that generates the seeds to generate one or more child seeds or grandchild seeds.

The HSM that received the request for the one-time signature (or, in some implementations, another HSM) derives one-time child keys from the seed, where the HSM (or other device, such as the server or another HSM) uses the one-time private key for generating the one-time signature. For example, the HSM that receives the request for the one-time signature may determine a seed based on the seed identifier associated with the request. In examples, the seed may be stored in the HSM. In some examples, the seed is encrypted and the seed (e.g., the encrypted seed) is then stored in a database outside of the HSM but within the signing environment (e.g., in a vault accessible by one or more other HSMs in the signing environment). In examples, the HSM may generate a key pair based on the seed. One key from the key pair (e.g., a private key) can then be used by the HSM to generate the one-time signature. For example, the HSM may generate the one-time signature based on the private key, the data associated with the request, and a cryptographic hash function (e.g., SHA-256, SHA-3, and/or the like). In some implementations, the HSM may then store the private key in memory on the HSM or destroy the private key. In this way, the HSM can ensure that only the HSM can ever sign data using the key generated for the one-time signature and forgo involving the key in subsequent generation of one-time signatures. In some implementations, when generating the one-time signature, the HSM may generate the one-time signature such that the signature contains "r," "s," and "v" components that can be used to recover the public key directly from the one-time signature. This can enable the server to return the one-time signature without the need to return the corresponding public key used to generate the one-time signature, and by extension enable other devices to establish the provenance of the signature when transmitted with the corresponding one-time signature. The server may implement APIs programmed to provide a client device with an industry standard implementation of protocols, including RFC 7516 JSON Web Encryption (JWE) object and RFC 7515-JSON Web Signature (JWS) object to construct an RFC 7519-JSON Web Token (JWT).

In some implementations, the HSM that receives the request for the one-time signature receives one or more identifiers (different from the seed identifier). For example, the HSM that receives the request for the one-time signature may receive one or more identifiers to generate the one-time signature. In this example, the HSM may generate the one-time signature based on the one or more identifiers, where the one or more identifiers correspond to a key that is associated with one or more of: the account associated with (e.g., involved in) the request for the one-time signature, a device involved in managing the account associated with the request for the one-time signature, or the device that transmitted the data associated with the request for the one-time signature.

At operation 240, the server receives the one-time signature from the HSM. For example, the server may receive the one-time signature from the HSM based on the HSM generating the one-time signature. In some implementations, the server receives a one-time public key corresponding to the one-time signature. For example, the server can receive a one-time public key that is associated with the private key used to generate the one-time signature. In examples, the server receives the one-time public key based on the HSM driving the pair of one-time keys from the seed and the HSM identifier.

In some implementations, the server receives a response message. For example, the server can receive a response message from the HSM that generate the one-time signature. In this example, the server receives the response message, where the response message includes the data associated with the request and the signature stored in association with the data. In this way, the server can later transmit the data associated with the request, the signature, and the one-time public key to enable other devices (e.g., other devices that trust the server) to confirm the provenance of the one-time signature associated with the data.

At operation 250, the server provides the one-time signature. For example, server may provide (e.g., transmit) the one-time public key and the response message having the one-time signature for the data associated with the request in response to the request. In some implementations, the server may provide the one-time public key, the response message having the one-time signature for the data associated with the request in response to the request, and the data originally signed by the HSM in coordination with the server. In some embodiments, the server provides a derived hierarchical path to the one-time public key.

FIGS. 3A-3E illustrate a non-limiting example of an implementation 300 of a process for signing data in a computing system in accordance with one or more embodiments. In some implementations, one or more of the computing devices described may be the same as, or similar to, one or more of the computing devices of FIG. 1. For example, client device 330, consuming application 330', and blockchain application 330" (collectively referred to as client devices 330) may be the same as, or similar to, client devices 130 of FIG. 1; HSMs 310a, 310b, 310c (collectively referred to as HSMs 310) may be the same as, or similar to, HSMs 110 of FIG. 1; and signer 340 may be the same as, or similar to, server 140 of FIG. 1. In some implementations, the signer 340 may be associated with an API (e.g., an API associated with the server 140 and/or the like that provides a RESTful interface for interacting with one or more client devices described herein).

As shown by operation 360, the client devices 130 transmit data associated with a request for a one-time signature to a signer 340. In some implementations, the client devices 130 transmit the data associated with the request, where the data is represented by (e.g., included in) a corresponding message. The data associated with the request may be transmitted to the signer 340 to cause the signer 340 to return a one-time signature. The signer 340 may be part of a signing environment 345 that includes one or more HSMs 310a-310c and/or one or more data sources (not explicitly illustrated). The signing environment 345 may be included in a secure environment 350. The secure environment 350 may be any computing environment configured to prevent unauthorized access to the signing environment 345 (e.g., one or more devices of the signing environment 345). In some implementations, the signing environment 345 may be an enclave where data associated with one or more requests is signed.

In some implementations, the request for the one-time signature may identify one or more accounts that are mapped to a client device 330 that requested the one-time signature. For example, the request for the one-time signature may identify a first account (e.g., a checking account, a savings account, an ETF account, and/or the like). The request can include a certificate (e.g., an x.509 certificate) associated with (e.g., held on) the client device 330 that can be used to authenticate and authorize the client device 330 when accessing a seed value associated with the first account. The client device 330 can have multiple certificates. In some examples, the request of the one-time signature may identify a first account that is mapped to one or more second accounts. In these examples, the first account may correspond to the client device 330, and the one or more second accounts may correspond to one or more accounts having one or more account types (where the one or more second accounts correspond to, for example, the checking account, the savings account, the ETF account, and/or the like). In this way, when coordinating the generation of one-time signatures using the HSMs 310, the signer 340 can identify the appropriate account and corresponding information (e.g., seed identifiers, HSM identifiers, and/or the like) involved in the generation of the one-time signature and provide the data associated with the request to the corresponding HSM 310 from among the HSMs 310 to cause the corresponding HSM 310 to generate the one-time signature. And by identifying the appropriate account and corresponding information, the signer 340 can confirm that a desired amount of entropy is introduced into the generation of the one-time signature.

As shown by operation 362, the signer 340 determines HSM identifiers for each request for a one-time signature. In some implementations, the signer 340 determines the HSM identifiers for each request based on each client device 330. For example, the signer 340 determines the HSM identifiers for each request based on a mapping associated with each client device 330. In this example, the mapping may represent a relationship between each client device 330 and a corresponding HSM 310 as described herein. The mapping may be established based on (e.g., in response to) the signer 340 receiving an initial request from each client device 330 for a one-time signature.

As shown by operation 364, the signer 340 provides data to HSMs 310. For example, the signer 340 can provide the data represented by messages received from the client devices 330 to the HSMs 310 based on the signer 340 receiving the requests for the one-time signatures. In some implementations, the signer 340 provides the data represented by the messages received from the client devices 330 based on the requests for the one-time signatures and the signer 340 determining the mappings between the client devices 330 requesting the one-time signatures and the corresponding HSMs 310.

As shown by operation 366, one-time keys are derived from seeds associated with accounts. For example, the HSMs 310 can derive the one-time keys from seeds associated with accounts involved in each request for a one-time signature. In such an example, the HSMs 310 can derive the one-time keys from the seeds associated with the accounts based on the HSMs 310 receiving the data associated with the one-time requests from the signer 340 and the HSMs 310 determining the seeds associated with (e.g., corresponding to) the one-time requests. In some implementations, the seeds may be stored locally by the HSMs 310. In some implementations, the seeds may be retrieved by the HSMs 310 from a database (e.g., a vault and/or the like).

In some implementations, the HSMs 310 are configured not to transmit a key from among the key pair. For example, the HSMs 310 may be configured not to transmit (e.g., to retain) a private key from among the key pair. In such an example, the HSMs 310 may store the private key from among the key pair in memory of the HSMs 310 and use the private key to generate a one-time signature as described herein.

As shown by operation 368, the HSMs 310 generate one-time signatures. For example, the HSMs 310 may generate one-time signatures based on the data associated with the requests for the one-time signatures and the corresponding one-time keys. In some implementations, the HSMs. 310 may generate the one-time signatures based on the data associated with the requests by signing the data associated with the requests with the private key from among the key pair generated by the HSMs 310. In examples, the one-time signatures can be generated by the HSMs 310 in accordance with the National Institute of Standards and Technology (NIST) Digital Signature Standards. In examples, the one-time signature is a non-deterministic digital signature.

As shown by operation 370, the HSMs 310 provide the one-time signatures to the signer 340. For example, the HSMs 310 may provide the one-time signatures to the signer 340 based on the HSMs 310 generating the one-time signatures. In some implementations, the HSMs 310 may provide a key (e.g., a public key) from among a key pair generated by the HSMs 310 for the one-time signature. In some implementations, the HSMs 310 may provide the data associated with the request, where the data associated with the request includes encrypted or decrypted forms of the data associated with the request that is accessible by authorized users. Further, in examples, the signer 340 or the HSMs 310 may determine the cryptographic function to use when generating the one-time signature.

In some implementations, the HSMs 310 and/or the signer 340 may maintain a record of the one-time signatures generated by the HSMs 310. For example, the signer 340 may maintain a record of the one-time signatures based on the generation of the one-time signatures and the signer 340 can store the record of the one-time signatures in memory or in a database in the signing environment.

As shown by operation 372, the signer 340 provides the one-time signatures to one or more client devices 330. For example, the signer 340 may provide the one-time signatures to one or more client devices 330 based on the signer 340 receiving the request for the one-time signatures. In some implementations, the signer 340 provides the one-time signatures and the data associated with the request (e.g., the message) to one or more of the client devices 330. In some implementations, the signer 340 provides the one-time signatures and a public key from the generated key pair to enable devices to confirm the provenance of the one-time signature.

As shown by operation 374, the client devices 330 store entries in association with the one-time signature with a system 355. For example, the client devices 330 may stores entries in association with the one-time signature based on the client devices 330 receiving the one-time signature from the signer 340. In this example, the system 355 may be associated with one or more organizations that manage or otherwise index multiple transactions. In an example, the system 355 may be a system that implements a distributed ledger. In examples, the system 355 may be a system that implements a blockchain-based distributed ledger. In this way, the system 355 may subsequently provide the one-time signature and/or the data associated with the transaction to other devices (e.g., other devices involved in one or more transaction that further involve the account associated with the client device 330) and the other devices can confirm the provenance of the data (e.g., representing the underlying transactions involved) that is stored via the system 355 (e.g., in a distributed ledger, blockchain structure, and/or the like). This, in turn, enables the traceability of transactions such as, for example, the transfer of ownership of a specific asset. In some embodiments implementing a distributed ledger and DLT systems, the DLT software functions may return m signatures (which also may be one-time signatures) associated with an m-of-n transaction (i.e., multi-signature) with which the one-time signature is used to complete the transaction.

In some implementations, the client device 330 transmits data in association with the one-time signature via a system for communicating between devices such as the Automated Clearing House (ACH) system or the Society for Worldwide Interbank Financial Telecommunication (SWIFT) system. For example, the client device 330 may transmit the data in association with the one-time signature via a system communicating with one or more other systems via the ACH or SWIFT systems. In these examples, the client device 330 may include the one-time signature in a field of the message that is configured to include signatures and/or the like.

In some implementations, the entries stored in association with the one-time signature may include and/or represent the data associated with the request (see operation 360). For example, the entries stored in association with the one-time signature may include the data associated with the request transmitted by the client device 330, the message representing the data associated with the request, and/or a hash of the data or message associated with the request.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

No aspect, component, element, structure, act, step, function, instruction, and/or the like used herein should be construed as critical or essential unless explicitly described as such. In addition, as used herein, the articles "a" and "an"

are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open ended terms. Further, the phrase "based on" is intended to mean "based at least partially on" unless explicitly stated otherwise.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method, comprising:
    receiving, by at least one processor and via an application programming interface (API), a request for a one-time signature and data associated with the request;
    determining, by the at least one processor, a hardware security module (HSM) identifier and a seed identifier for a seed according to an account associated with the request;
    providing, by the at least one processor, the seed identifier associated with the seed to an HSM corresponding to the HSM identifier, the seed identifier indicating the seed that is mapped to an account of a plurality of accounts and stored at the HSM for generating the one-time signature, the HSM included in a set of HSMs;
    receiving, by the at least one processor, from the HSM a response message having the one-time signature for the data associated with the request, the one-time signature based on a one-time private key derived from the seed; and
    transmitting, by the at least one processor, a one-time public key and the response message having the one-time signature for the data associated with the request in response to the request.

2. The computer-implemented method of claim 1, comprising:
    providing, by the at least one processor, the seed identifier and at least one identifier to the HSM corresponding to the HSM identifier to cause the HSM to generate the one-time private key that does not collide with keys generated by the set of HSMs,
    wherein the HSM identifier is a globally unique identifier for deriving the one-time private key from the seed to generate the one-time signature; and
    wherein the at least one identifier is associated with one or more of:
        the account associated with the request, an identifier associated with a device involved in managing the account associated with the request, or
an identifier associated with the device that transmitted the data associated with the request for the one-time signature.

3. The computer-implemented method of claim 1, further comprising:
determining, by the at least one processor, the seed based at least in part on a random number generator.

4. The computer-implemented method of claim 1, further comprising:
initiating, by the at least one processor, a key exchange with a remote device that is associated with the account.

5. The computer-implemented method of claim 1, wherein determining the HSM identifier comprises:
selecting the HSM identifier from among a plurality of HSM identifiers, and
wherein determining the seed identifier to generate the one-time signature comprises:
determining the seed identifier based on a mapping to the account of the plurality of accounts.

6. The computer-implemented method of claim 1, further comprising:
determining, by the at least one processor, a seed value for each HSM included in the set of HSMs.

7. The computer-implemented method of claim 1, wherein the account corresponding to the seed includes at least one of a user or a software application.

8. A system comprising:
at least one hardware processor programmed to:
receive, via an application programming interface (API), a request for a one-time signature and data associated with the request;
determine a hardware security module (HSM) identifier and a seed identifier for a seed according to an account associated with the request;
provide the seed identifier associated with the seed to an HSM corresponding to the HSM identifier, the seed identifier indicating the seed that is mapped to an account of a plurality of accounts and stored at the HSM for generating the one-time signature, the HSM included in a set of HSMs;
receive a one-time public key from the HSM based on the HSM deriving a pair of one-time keys from the seed and the HSM identifier, and a response message having the one-time signature for the data associated with the request; and
transmit the one-time public key and the response message having the one-time signature for the data associated with the request in response to the request.

9. The system of claim 8, wherein the at least one hardware processor is programmed to:
provide the seed identifier and at least one identifier to the HSM corresponding to the HSM identifier,
wherein the HSM identifier is a globally unique identifier for deriving a one-time private key from the seed to generate the one-time signature; and
wherein the at least one identifier is associated with one or more of:
the account associated with the request,
an identifier associated with a device involved in managing the account associated with the request, or
an identifier associated with the device that transmitted the data associated with the request for the one-time signature.

10. The system of claim 8, wherein the at least one hardware processor is programmed to:
determine the seed based at least in part on a random number generator.

11. The system of claim 8, wherein the at least one hardware processor is further programmed to:
initiate a key exchange with a remote device that is associated with the account.

12. The system of claim 8, wherein the at least one hardware processor is programmed to:
select the HSM identifier from among a plurality of HSM identifiers; and
determine the HSM identifier based on selection of the HSM identifier from among the plurality of HSM identifiers, and
determine the seed identifier to generate the one-time signature based on a mapping to the account of the plurality of accounts.

13. The system of claim 8, wherein the at least one hardware processor is further programmed to:
determine a seed value for each HSM included in the set of HSMs.

14. The system of claim 8, wherein the account corresponding to the seed includes at least one of a user account or a software application.

15. A non-transitory computer-readable medium storing instructions thereon that, when executed by at least one processor, cause the at least one processor to:
receive, via an application programming interface (API), a request for a one-time signature and data associated with the request;
determine a hardware security module (HSM) identifier and a seed identifier for a seed according to an account associated with the request;
provide the seed identifier associated with the seed to an HSM corresponding to the HSM identifier, the seed identifier indicating the seed that is mapped to an account of a plurality of accounts and stored at the HSM for generating the one-time signature, the HSM included in a set of HSMs;
receive a one-time public key from the HSM based on the HSM deriving a pair of one-time keys from the seed and the HSM identifier, and a response message having the one-time signature for the data associated with the request; and
transmit the one-time public key and the response message having the one-time signature for the data associated with the request in response to the request.

16. The non-transitory computer-readable medium of claim 15, wherein the instructions further cause the at least one processor to:
provide the seed identifier and at least one identifier to the HSM corresponding to the HSM identifier,
wherein the HSM identifier is a globally unique identifier for deriving a one-time private key from the seed to generate the one-time signature; and
wherein the at least one identifier is associated with one or more of:
the account associated with the request,
an identifier associated with a device involved in managing the account associated with the request, or
an identifier associated with the device that transmitted the data associated with the request for the one-time signature.

17. The non-transitory computer-readable medium of claim 15, wherein the instructions further cause the at least one processor to:

determine the seed based at least in part on a random number generator.

18. The non-transitory computer-readable medium of claim 15, wherein the instructions further cause the at least one processor to:
   initiate a key exchange with a remote device that is associated with the account.

19. The non-transitory computer-readable medium of claim 15, wherein the instructions cause the at least one processor to:
   select the HSM identifier from among a plurality of HSM identifiers; and
   determine the HSM identifier based on selection of the HSM identifier from among the plurality of HSM identifiers, and
   determine the seed identifier to generate the one-time signature based on a mapping to the account of the plurality of accounts.

20. The non-transitory computer-readable medium of claim 15, wherein the instructions further cause the at least one processor to:
   determine a seed value for each HSM included in the set of HSMs.

\* \* \* \* \*